Patented Apr. 10, 1928.

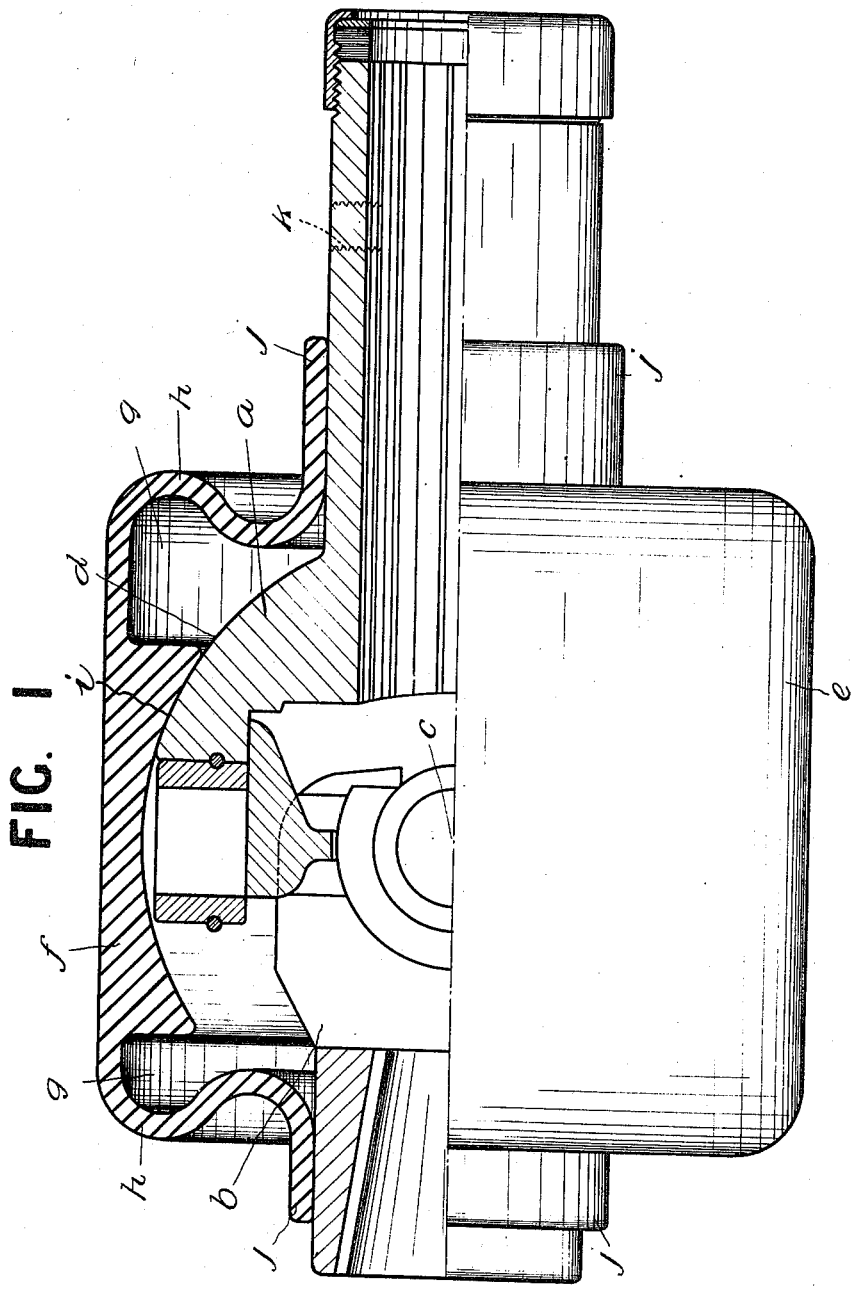

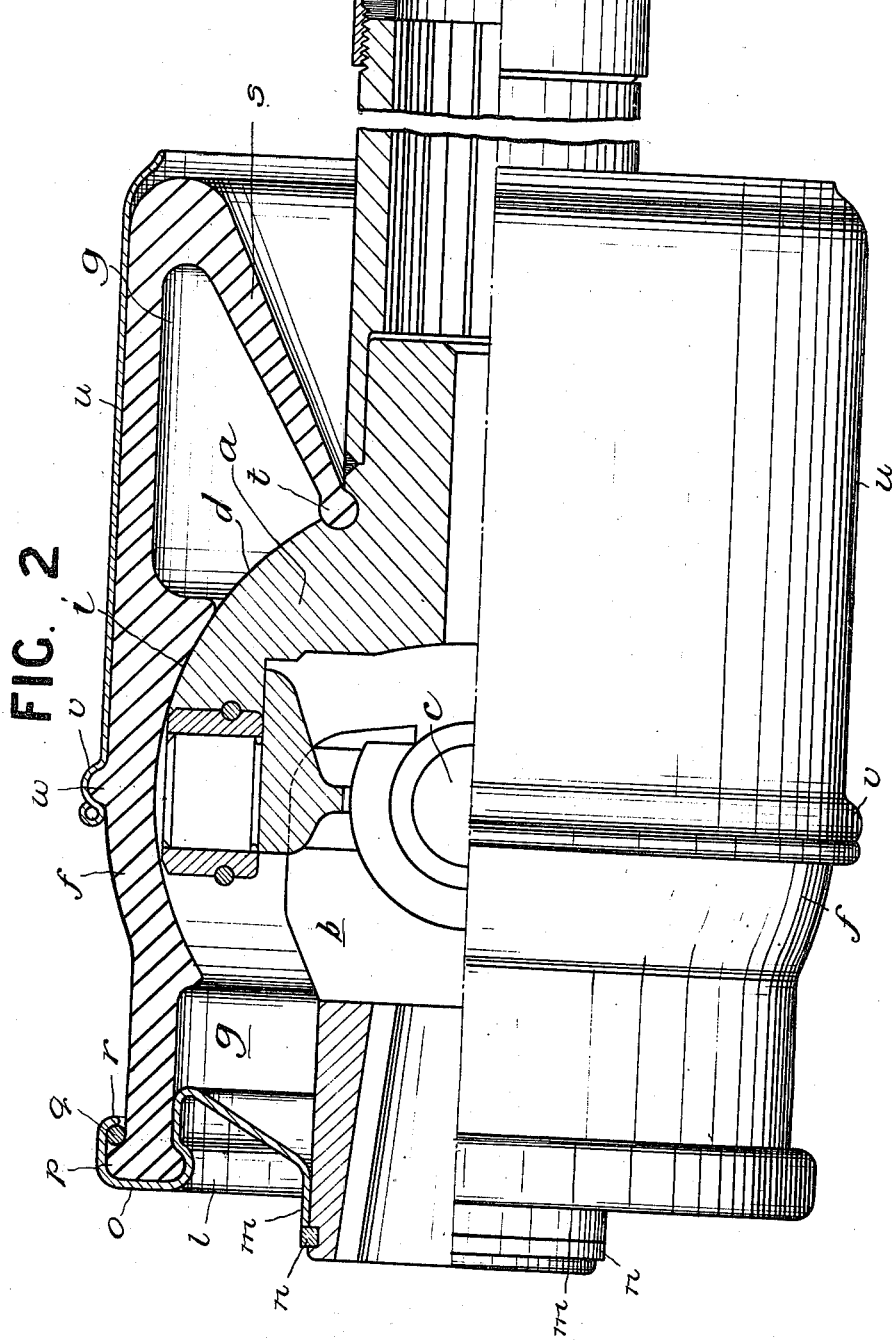

1,665,734

UNITED STATES PATENT OFFICE.

HERBERT CLARK, OF WYLDE GREEN, ENGLAND.

UNIVERSAL JOINT OR COUPLING.

Application filed March 28, 1927, Serial No. 178,958, and in Great Britain December 28, 1926.

This invention relates to improvements in universal joints or couplings such as are employed for connecting two shafts employed under such conditions that one shaft has movement relative to the other about one or both axes of the joint. Such joints are commonly employed in motor vehicle transmission gearing at each end of the propeller shaft or in the shaft between the engine and the gearbox.

Joints of this type require effective lubrication to maintain their efficiency and keep down wear of the parts, and it is also desirable that they should be protected from road dust and grit.

These conditions are difficult to ensure in practice as the joint is generally a floating one. In some cases a leather cover is provided over the joint but this has to be laced around the shafts and is liable to come loose, and difficulty is experienced in making such a cover oil or grease-tight.

The object of my invention is to provide improved means for efficiently lubricating and protecting a universal joint or coupling, the means being readily applied to existing joints if desired.

Two practical forms of my invention are illustrated in the accompanying drawings in which :—

Figure 1 is a side elevation of a universal coupling fitted with a cover according to my invention the parts above the centre line being shown in section.

Figure 2 is a similar view showing a modified form of cover.

In Figs. 1 and 2 $a$ and $b$ are the two main members of the coupling adapted to swivel around a common centre at $c$, the coupling being of known type. The peripheral surface of the coupling is of part-spherical contour as shown at $d$.

The cover or casing $e$ shown in Fig. 1 is moulded in one piece from suitable flexible material such as rubber or rubber compound and is flexible, seamless, jointless and unbroken. The central part $f$ of the casing is of substantial thickness and is of cylindrical outline externally but has a curved inner face $i$ fitting closely around the part-spherical peripheral surface $d$ of the coupling. The casing is extended for a short distance on each side of the central part $f$ to form annular pockets $g$, before being curved inwardly at $h$ to merge into short sleeves $j$ which fit tightly around the cylindrical ends of the coupling members $a$ and $b$.

The pockets $g$ are of substantial dimensions to contain lubricant, and sufficient lubricant can be carried in the pockets to keep the joint effectively lubricated over a very long period. For refilling the pockets a greaser can be screwed into an aperture $k$ in the sleeve end of the coupling member $a$, and grease or oil is forced into the greaser by a grease-gun or like implement and is forced along the relief in the splines of the shafts or through passage-ways formed therein to fill the pockets $g$.

Lubricant cannot escape owing to the sleeves $j$ at each end of the casing which fit tightly around the respective coupling members, and as the casing is of flexible material its presence does not appreciably affect the normal flexibility of the joint. I prefer a rubber compound for the flexible material which is capable of being moulded, and at the same time such compounds are now known which are highly resistant to deterioration in the presence of oil or grease.

To fit the casing it is slipped on to the coupling from one end, one of the sleeves $j$ being resiliently stretched to permit it to pass over the coupling, the diameter of which may be reduced by bending the coupling joint to an angle of, for instance, 45 degrees, so that the casing may pass over it without sufficient distortion to unduly stretch the casing. In practice I have found it to be quite practicable to form the casings of material which, after being stretched to pass over the coupling, will contract to satisfactorily grip the shaft.

In the modified construction shown in Fig. 2 one end wall of the casing is replaced by a dished sheet metal closure member $l$ having a sleeve part $m$ to fit around the outer end of the coupling member $b$, the sleeve part being located by a spring ring $n$ in an annular recess in the member $b$. The outer part of the closure $l$ is formed with an annular slot $o$ to receive the beaded end $p$ of the casing which is retained therein by a ring $q$ sprung under an inturned lip $r$ of the slot. This construction avoids stretching of the casing when fitting it to a coupling, and preferably fabric is incorporated with the rubber or rubber compound in this case to strengthen the casing.

At the other end of the casing an end wall is formed by an integral inturned flange *s* having the form of a truncated cone which would have its apex at the centre of the coupling. The flange terminates in a bead *t* which is received in an annular groove in the coupling member *a*. The object of this arrangement is so that any movement of the coupling member *a* from the normal position shown will tend to stretch the flange *t* which will thus exert an inward pull on the casing and resist the outward pull of centrifugal force as the coupling rotates.

As an additional support for the casing it may be enclosed within a cylindrical sheet metal cover *u* extending from the flanged end to the plane of the centre of the coupling. This cover is retained in position by a hollow rib *v* at or near one end fitting over a projecting annular rib *w* on the casing. The cover is adapted to be slipped on after the casing has been fitted to the coupling.

I claim:—

1. A cover for a universal coupling between two shafts comprising a flexible seamless and jointless casing moulded from flexible material having a central portion fitting closely around the coupling, annular pockets on each side of the central portion to receive lubricant, and means adapted to engage the coupling members and thereby close said pockets.

2. A cover for a universal coupling between two shafts comprising a flexible seamless and jointless casing moulded from flexible material having a thickened central portion of said casing with a curved inner face to fit closely around a partly spherical peripheral contour of the coupling.

3. A cover for universal couplings between two shafts, comprising a flexible and resilient moulded casing, a thickened intermediate portion fitting closely around a curved peripheral contour of the coupling, lubricant pockets on each side of said intermediate thickened portion, and means provided with inner lips adapted to seal against the coupling members and constitute end closers.

4. A cover for universal couplings between two shafts, comprising a flexible and resilient moulded casing, a thickened intermediate portion fitting closely around a curved peripheral contour of the coupling, lubricant pockets on each side of said intermediate thickened portion, and means adapted to engage the coupling members and provided with inner lips adapted to seal against the coupling members and constitute end closers, one of said closers being a removable rigid ring member, and the other an integral inturned flange on said casing.

5. A cover for universal couplings between two shafts, comprising a flexible and resilient moulded casing, a thickened intermediate portion fitting closely around a curved peripheral contour of the coupling, lubricant pockets on each side of said intermediate thickened portion, and means adapted to engage the coupling members and provided with inner lips adapted to seal against the coupling members and constituting end closers, one of said closers being a removable rigid ring member, and the other an integral inturned flange on said casing, the said integral flange being in the form of a truncated cone of which the apex would coincide with the axis of the coupling, and the extremity of the flange being received in an annular recess in one part of the coupling.

6. A cover for universal couplings between two shafts, comprising a flexible and resilient moulded casing, a thickened intermediate portion fitting closely around a curved peripheral contour of the coupling, lubricant pockets on each side of said intermediate thickened portion, and means adapted to engage the coupling members and provided with inner lips adapted to seal against the coupling members and constitute end closers, and a cylindrical sheet metal cover enclosing a part of said casing, one of said closers being a removable rigid ring member, and the other an integral inturned flange on said casing.

In testimony whereof I affix my signature.

HERBERT CLARK.